(12) United States Patent
Chiba et al.

(10) Patent No.: US 10,511,734 B2
(45) Date of Patent: Dec. 17, 2019

(54) PORTABLE TERMINAL, IMAGING DEVICE AND READING DEVICE

(71) Applicant: CASIO COMPUTER CO., LTD., Shibuya-ku, Tokyo (JP)

(72) Inventors: Yasunori Chiba, Tachikawa (JP); Satoshi Ogasawara, Akishima (JP); Shinya Okumura, Kusatsu (JP); Yoshiaki Mochizuki, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/039,550

(22) Filed: Jul. 19, 2018

(65) Prior Publication Data

US 2019/0028600 A1    Jan. 24, 2019

(30) Foreign Application Priority Data

Jul. 20, 2017   (JP) ................. 2017-141269

(51) Int. Cl.
*H04N 1/00* (2006.01)
*H04N 1/195* (2006.01)
*G06K 7/10* (2006.01)

(52) U.S. Cl.
CPC ..... *H04N 1/00564* (2013.01); *G06K 7/10881* (2013.01); *H04N 1/00525* (2013.01);
(Continued)

(58) Field of Classification Search
CPC ............... G03B 17/02; G06K 7/10881; G06K 2007/10524; G06K 7/1413; G06K 7/10544; G06K 7/10554; G06K 7/10722; G06K 17/0022; H04N 5/2251; H04N 5/2252; H04N 1/00525; H04N 1/00564;
(Continued)

(56) References Cited

U.S. PATENT DOCUMENTS 5,477,043 A    12/1995  Dvorkis
5,801,918 A *  9/1998   Ahearn  .............. G06K 7/10881
                                                     235/472.01
(Continued)

FOREIGN PATENT DOCUMENTS

CN    101887953 A    11/2010
JP    H10112891 A    4/1998
(Continued)

OTHER PUBLICATIONS

Related U.S. Appl. No. 16/039,528; First Named Inventor: Yasunori Chiba; Title: "Portable Terminal"; filed Jul. 19, 2018.
(Continued)

*Primary Examiner* — Negussie Worku
(74) *Attorney, Agent, or Firm* — Holtz, Holtz & Volek PC

(57) ABSTRACT

A portable terminal including a battery accommodating section having an opening for battery insertion and removal which is provided at a position shifted to one end of a terminal main body on a predetermined surface of the terminal main body, a battery cover for covering the opening, and a switch section provided closer to an other end of the terminal main body than the battery accommodating section, on the predetermined surface of the terminal main body, in which the battery cover is provided extending from the one end to a position beyond the switch section.

20 Claims, 10 Drawing Sheets

(52) U.S. Cl.
CPC .................. *H04N 1/19589* (2013.01); *G06K 2007/10524* (2013.01)

(58) Field of Classification Search
CPC ............... H04N 1/19589; H01H 13/10; H01H 2225/028; H01H 2231/022; G06F 1/1626; G06F 1/1635; G06F 1/1637; G06F 1/1656; G06F 1/1662; G06F 1/263; G06F 1/3206; H01M 2/0404; H01M 2/1055; H01M 2/1066; H02J 9/06; H02J 50/12; H02J 50/80; H02J 7/0047; H02J 7/025; Y10T 307/625; H04B 5/0037
USPC ........................................................ 358/474
See application file for complete search history.

(56) References Cited

U.S. PATENT DOCUMENTS

| | | | |
|---|---|---|---|
| 7,450,968 B2 | 11/2008 | Jung | |
| 7,775,438 B2 | 8/2010 | Beckhusen et al. | |
| 7,839,632 B2 * | 11/2010 | Matsui | G06K 7/10881 341/22 |
| 8,254,114 B2 | 8/2012 | Lin | |
| 8,730,155 B2 | 5/2014 | Araki et al. | |
| 8,814,049 B2 | 8/2014 | Lee et al. | |
| 2008/0084654 A1 * | 4/2008 | Gerich | H02B 1/50 361/601 |
| 2009/0002926 A1 * | 1/2009 | Matsui | G06K 7/10881 361/679.56 |
| 2010/0290177 A1 | 11/2010 | Lin | |
| 2010/0302140 A1 | 12/2010 | Araki et al. | |
| 2012/0088547 A1 | 4/2012 | Lee et al. | |
| 2014/0014726 A1 | 1/2014 | Tsiopanos et al. | |
| 2016/0064874 A1 * | 3/2016 | Meguro | H01H 13/10 235/462.48 |
| 2018/0084654 A1 * | 3/2018 | Meguro | H05K 5/0008 |
| 2018/0217638 A1 * | 8/2018 | Ohtaka | H01M 2/1066 |
| 2019/0026515 A1 * | 1/2019 | Chiba | G06K 7/10722 |
| 2019/0026517 A1 * | 1/2019 | Chiba | G06K 7/10881 |
| 2019/0026518 A1 * | 1/2019 | Chiba | G06K 7/10881 |
| 2019/0082041 A1 * | 3/2019 | Chiba | H04M 1/0262 |

FOREIGN PATENT DOCUMENTS

| | | |
|---|---|---|
| JP | 2001060999 A | 3/2001 |
| JP | 2004252600 A | 9/2004 |
| JP | 2005027335 A | 1/2005 |
| JP | 2009009196 A | 1/2009 |
| JP | 2009282761 A | 12/2009 |
| JP | 2010277508 A | 12/2010 |
| JP | 2011107824 A | 6/2011 |
| JP | 2012027923 A | 2/2012 |
| JP | 2012130025 A | 7/2012 |
| JP | 2013156752 A | 8/2013 |
| JP | 2014085684 A | 5/2014 |

OTHER PUBLICATIONS

Related U.S. Appl. No. 16/039,583; First Named Inventor: Yasunori Chiba; Title: "Portable Terminal"; filed Jul. 19, 2018.
Related U.S. Appl. No. 16/039,603; First Named Inventor: Yasunori Chiba; Title: "Portable Terminal, Imaging Device and Reading Device"; filed Jul. 19, 2018.
U.S. Appl. No. 16/039,528, filed Jul. 19, 2018.
U.S. Appl. No. 16/039,583, filed Jul. 19, 2018.
U.S. Appl. No. 16/039,603, filed Jul. 19, 2018.
Office Action (Final Rejection) dated Jul. 18, 2019 issued in U.S. Appl. No. 16/039,603.
Office Action (Non-Final Rejection) dated Mar. 20, 2019 issued in U.S. Appl. No. 16/039,583.
Office Action (Non-Final Rejection) dated Feb. 27, 2019 issued in U.S. Appl. No. 16/039,528.
Office Action (Non-Final Rejection) dated Mar. 1, 2019 issued in U.S. Appl. No. 16/039,603.
Office Action (Final Rejection) dated Aug. 19, 2019 issued in related U.S. Appl. No. 16/039,583.
Japanese Office Action dated Sep. 24, 2019 (and English translation thereof) issued in Japanese Application No. 2017-141269.

* cited by examiner

PORTABLE TERMINAL, IMAGING DEVICE AND READING DEVICE

CROSS-REFERENCE TO RELATED APPLICATION

This application is based upon and claims the benefit of priority from the prior Japanese Patent Application No. 2017-141269, filed Jul. 20, 2017, the entire contents of which are incorporated herein by reference.

BACKGROUND OF THE INVENTION

1. Field of the Invention

The present invention relates to a handheld portable terminal, an imaging device and a reading device.

2. Description of the Related Art

For example, a hand-held portable terminal is known which has a structure where the lower surface of a device case is formed to have a curved shape and a finger rest projected portion is provided on the lower surface of the device case so that the device case can be gripped by one hand with the thumb of a holding hand of a user being placed on the upper surface of the device case, the other fingers being placed on the lower surface of the device case, and the index finger being hooked on the finger rest projected portion, as described in Japanese Patent Application Laid-Open (Kokai) Publication No. 10-112891.

That is, the portable terminal, of this type is structured as follows. The device case is gripped by one hand with the thumb being placed on an operation section provided on the upper surface of the device case and the other fingers being placed on the lower surface of the device case, and the index finger is hooked on the finger rest projected portion provided on the lower surface of the device case as if it is hooked on the trigger of a pistol, so that the operation section on the upper surface is operated by the thumb and a switch key provided on the finger rest projected portion on the lower surface is subjected to a key operation by the index finger.

Here, the portable terminal has a structure where the finger rest projected portion is provided on the lower surface of the device case, the switch key is provided inside the device case so as to be exposed from the finger rest projected portion, and a battery cover is provided on the lower surface of the device case excluding the finger rest projected portion.

SUMMARY OF THE INVENTION

In accordance with one aspect of the present invention, there is provided a portable terminal comprising: a battery accommodating section having an opening for battery insertion and removal which is provided at a position shifted to one end of a terminal main body on a predetermined surface of the terminal main body; a battery cover for covering the opening; and a switch section provided closer to an other end of the terminal main body than the battery accommodating section, on the predetermined surface of the terminal main body, wherein the battery cover is provided extending from the one end to a position beyond the switch section.

In accordance with another aspect of the present invention, there is provided an imaging device comprising: a battery accommodating section having an opening for battery insertion and removal which is provided at a position shifted to one end of a terminal main body on a predetermined surface of the terminal main body; a battery cover for covering the opening; an imaging section provided closer to an other end of the terminal main body than the battery accommodating section, on the predetermined surface of the terminal main body; and a switch section provided in an area between the battery accommodating section and the imaging section so as to start an imaging operation by the imaging section, wherein the battery cover is provided extending from the one end to a position beyond the switch section.

In accordance with another aspect of the present invention, there is provided a reading device comprising: a battery accommodating section having an opening for battery insertion and removal which is provided at a position shifted to one end of a terminal main body on a predetermined surface of the terminal main body; a battery cover for covering the opening; an optical reading section provided closer to an other end of the terminal main body than the battery accommodating section, on the predetermined surface of the terminal main body; and a switch section provided in an area between the battery accommodating section and the optical reading section so as to start a reading operation by the optical reading section, wherein the battery cover is provided extending from the one end to a position beyond the switch section.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of a portable terminal to which the present invention has been applied will hereinafter be described with reference to FIG. 1 to FIG. 10.

This portable terminal includes a device case 1 as a terminal main body, as shown in FIG. 1 to FIG. 4. This device case 1 is formed to have a substantially rectangular shape elongated in a longitudinal direction (portrait orientation in FIG. 1).

This device case 1 is formed to have its substantially half on an upper side as a broad portion 1a, have the remaining half on a lower side as a narrow portion 1b, and have a substantially Japanese battledore shape as a whole, as shown in FIG. 1 to FIG. 4. That is, the broad portion 1a on the upper side is formed so as to have a length (width) in a lateral direction (landscape orientation in FIG. 1) orthogonal to its longitudinal direction longer (wider) than the length (width) of the narrow section 1b on the lower side in the lateral direction (landscape orientation in FIG. 1).

Figure 1:
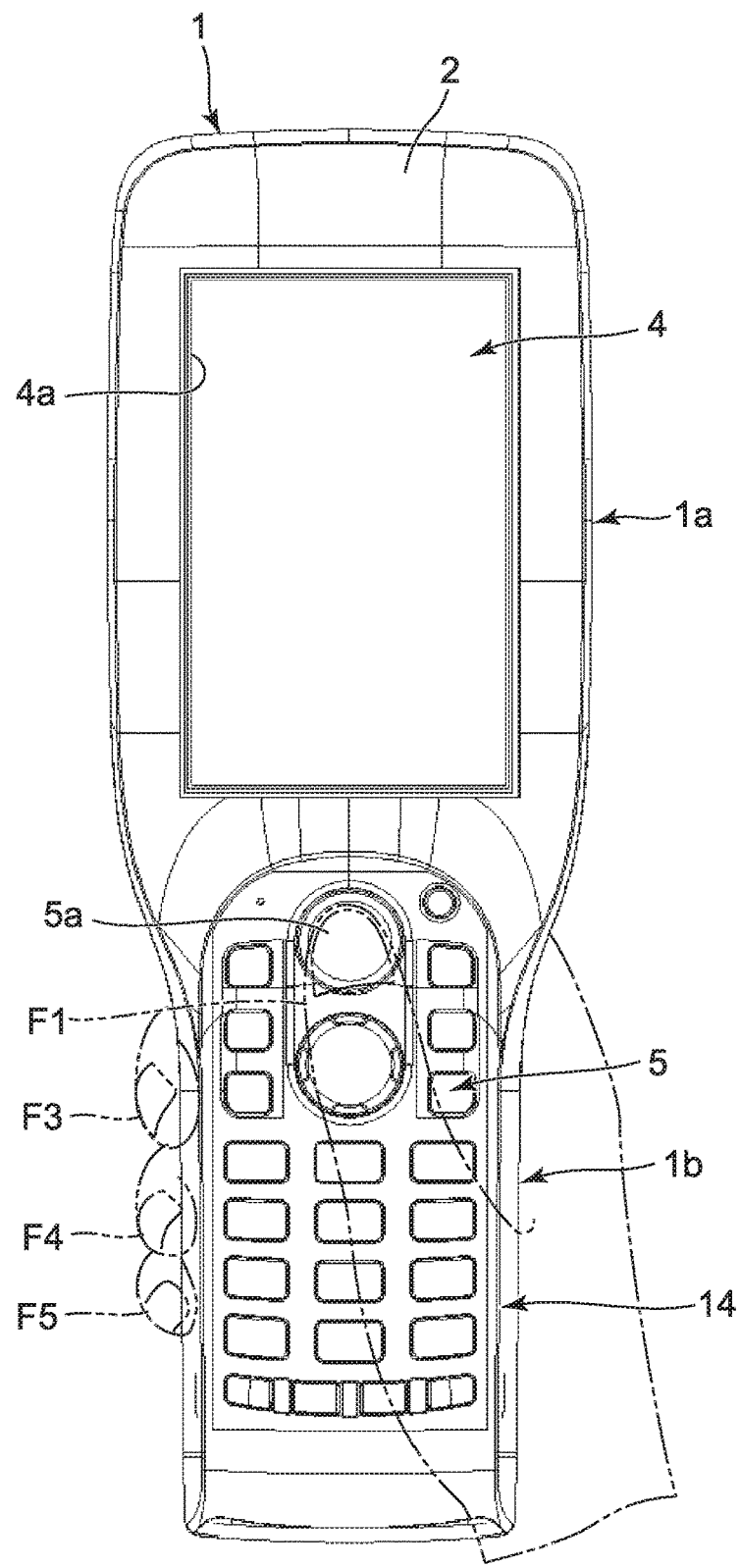
FIG. 1 is a front view of an embodiment in which the present invention has been applied to a portable terminal.
Figure 2:
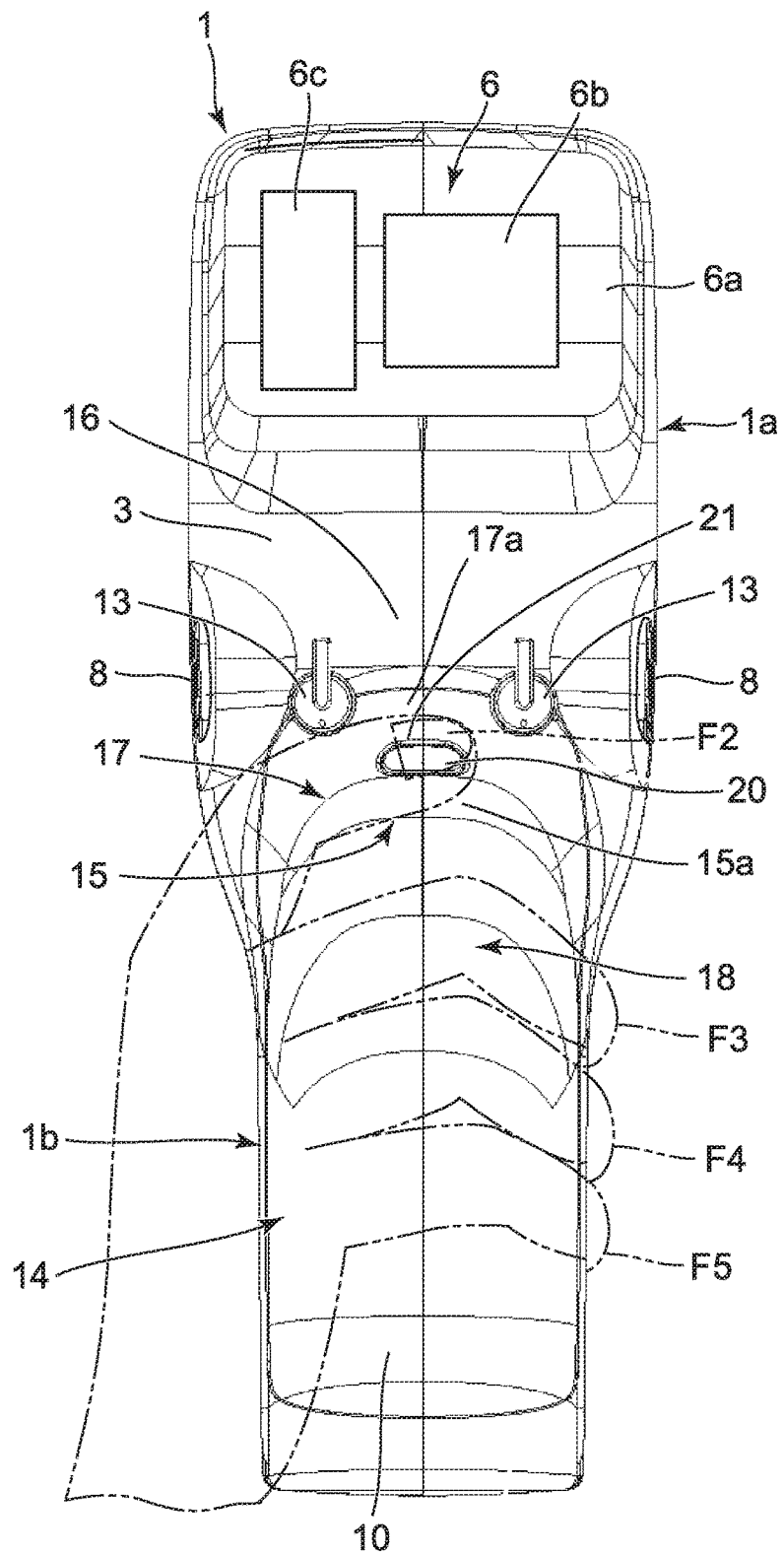
FIG. 2 is a rear view of the portable terminal shown in FIG. 1.
Figure 3:
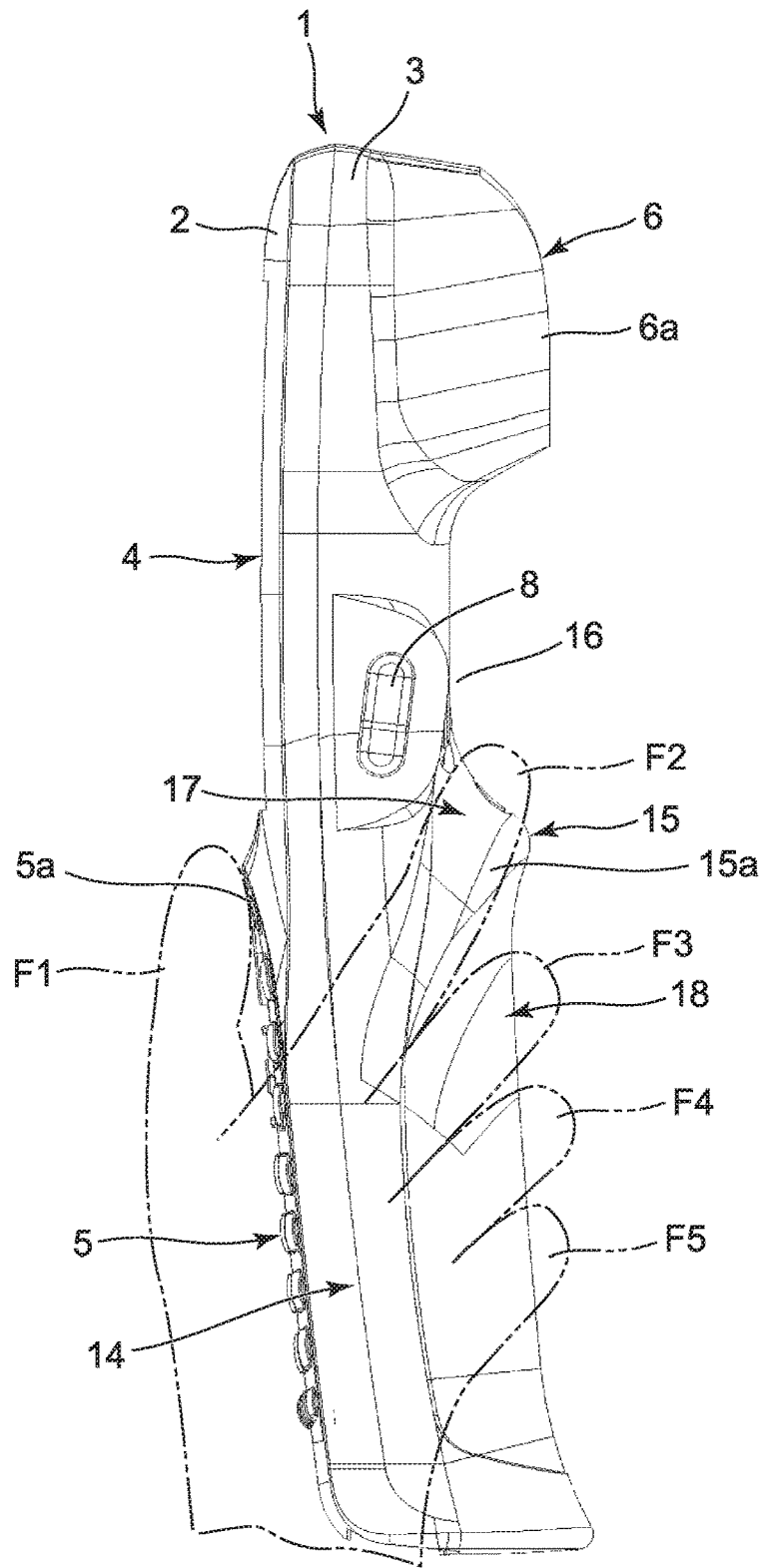
FIG. 3 is a left side view of the portable terminal shown in FIG. 2.

Also, this device case 1 is structured to have an upper case 2 and a lower case 3 and have modules (not shown) incorporated therein, as shown in FIG. 1 to FIG. 5. The upper case 2 is structured to be formed, as with the device case 1, in a substantially Japanese battledore shape having a broad portion on the upper side and a narrow portion on the lower side and have a side surface portion of its outer edge attached to the lower case 3, as shown in FIG. 1 and FIG. 3.

Figure 5:
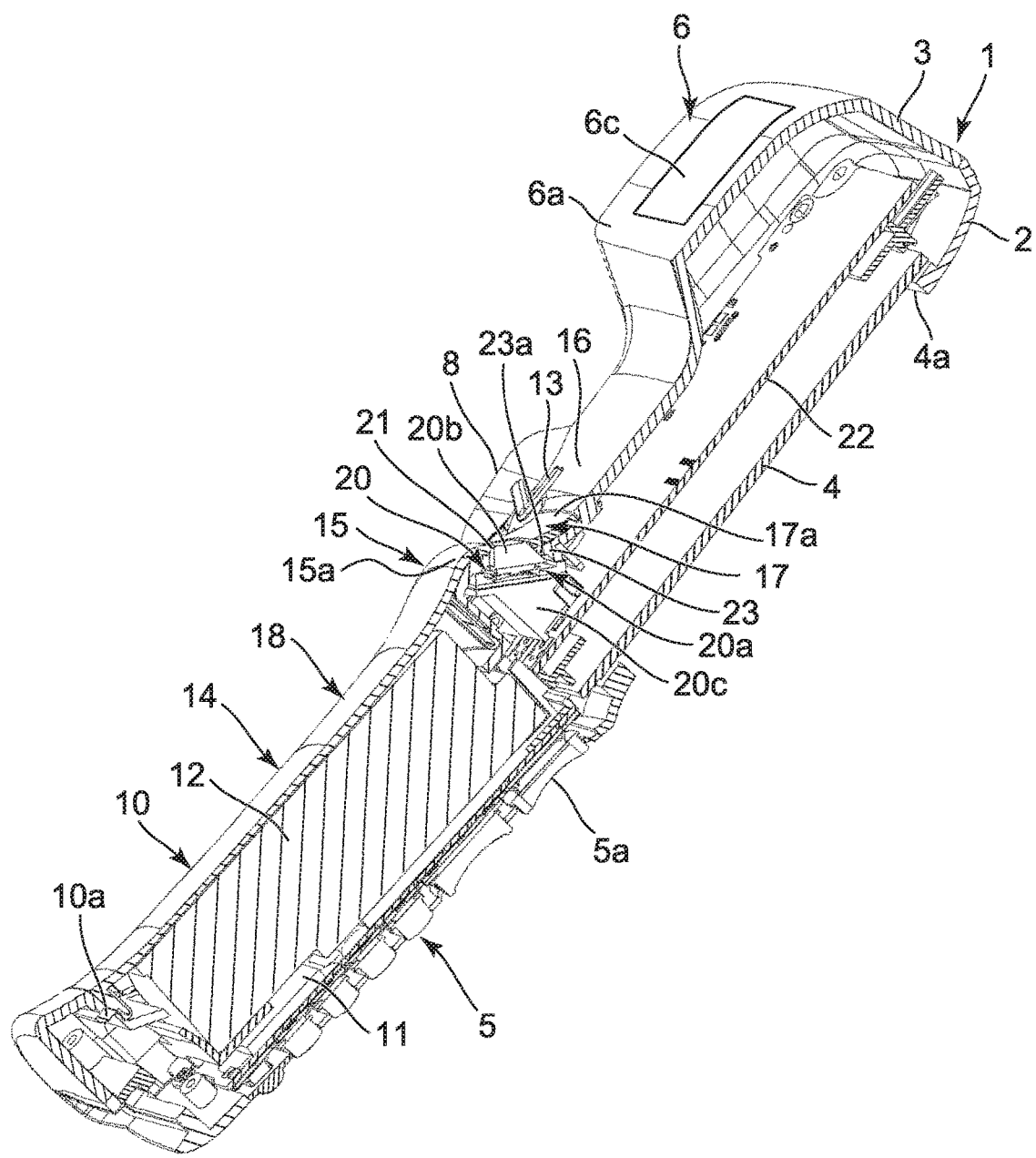
FIG. 5 is a perspective view showing a cross section of the portable terminal taken along line A-A in FIG. 4.
Figure 6:
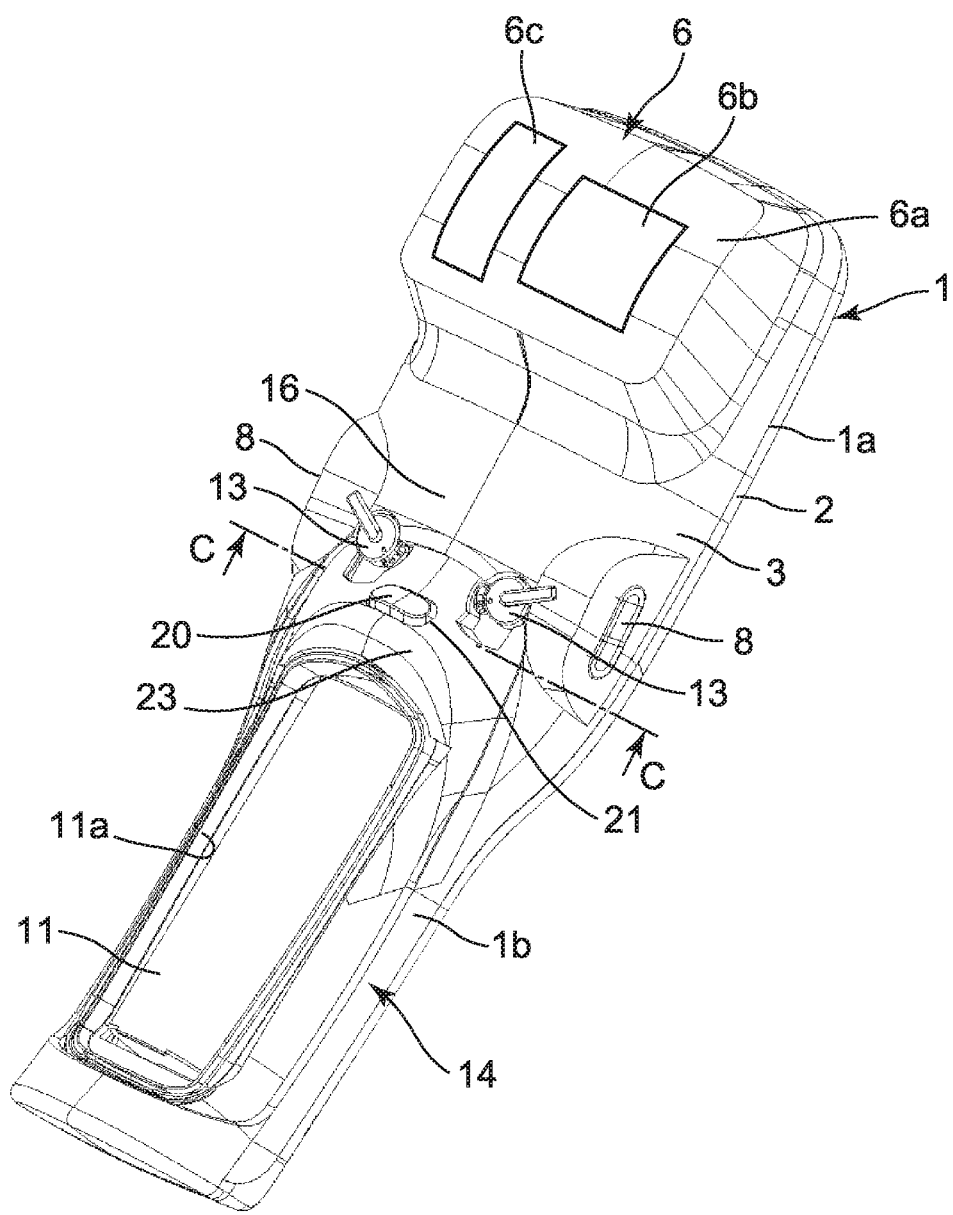
FIG. 6 is a perspective view showing the portable terminal shown in FIG. 4, in which a battery cover has been removed.
Figure 7:
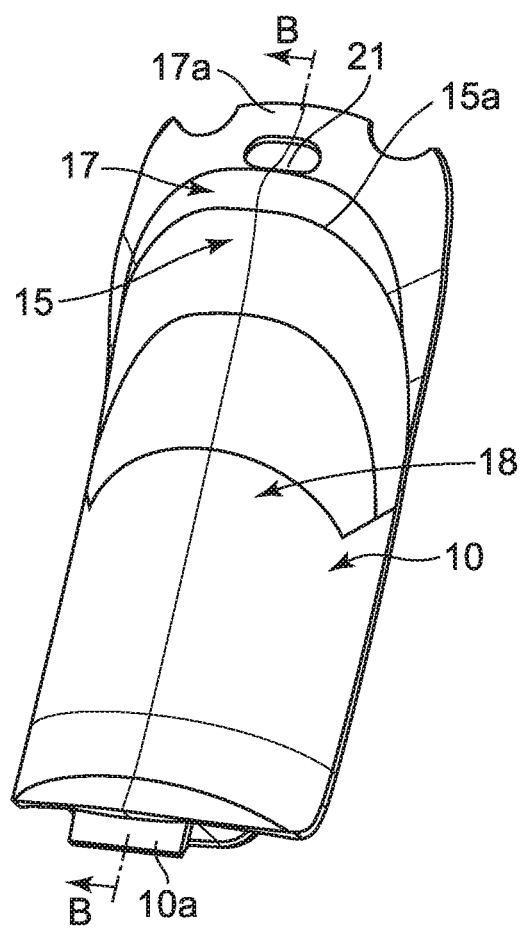
FIG. 7 is a perspective view of the battery cover of the portable terminal shown in FIG. 4.
Figure 8:
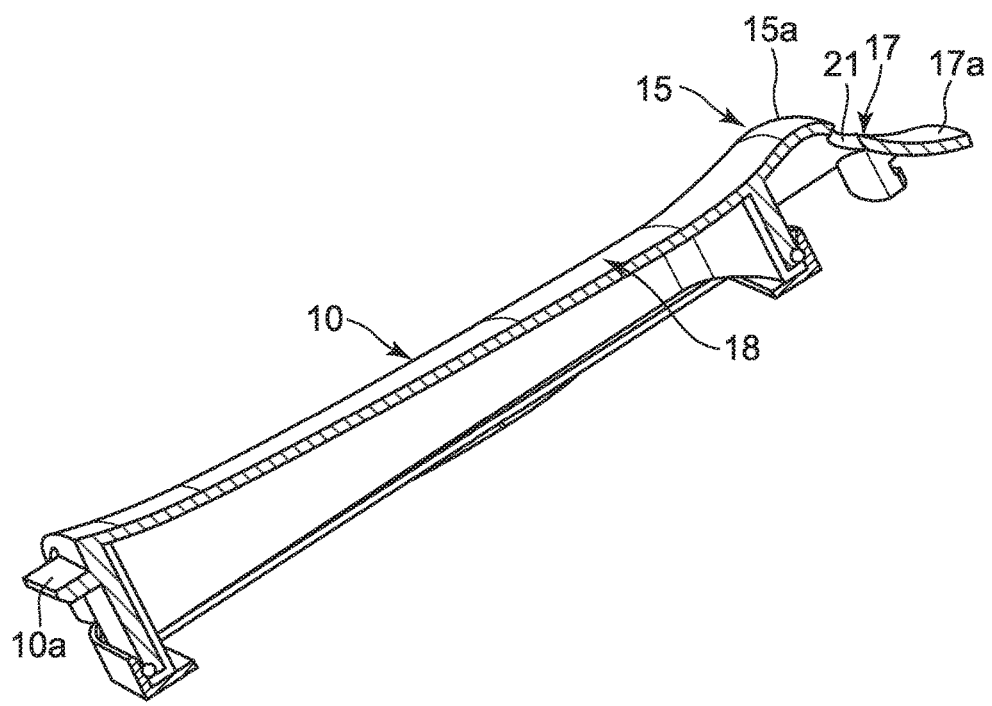
FIG. 8 is a perspective view of a cross section of the battery cover taken along line B-B in FIG. 7.

Also, on the broad portion on the upper side on the front surface that is the upper surface of the upper case 2, a display section 4 is provided over a substantially entire area, as shown in FIG. 1 and FIG. 5. Also, on the narrow portion on the lower side on the front surface of the upper case 2, a key operation section 5 is provided over a substantially entire area. The display section 4 is a display panel of a flat-surface type, such as a liquid-crystal display panel or EL (electroluminescence) display panel, and is formed to have a substantially rectangular shape.

This display section 4 is structured to be arranged in the upper case 2 so as to correspond to a display window section 4a provided on the front surface of the upper case 2, whereby information displayed on the display section 4 can be viewed from above the upper case 2 through the display window section 4a, as shown in FIG. 1 and FIG. 5. The key operation section 5 includes various keys required for the portable terminal, such as numeric keys, a cursor key, and function keys. In the present embodiment, the key operation section 5 has an upper surface trigger key 5a arranged on its upper middle area.

Figure 4:
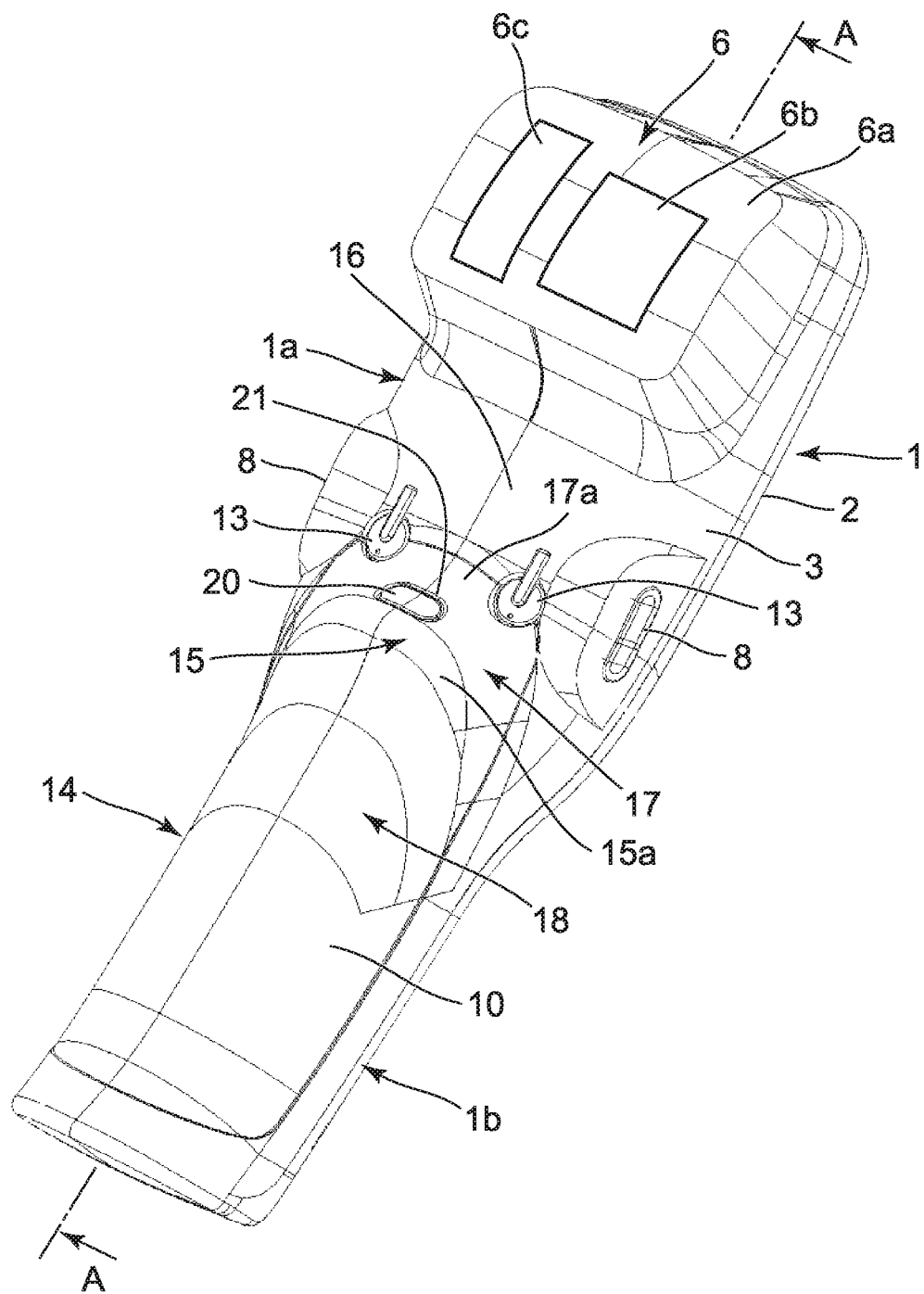
FIG. 4 is a rear perspective view of the portable terminal shown in FIG. 1.

The lower case 3 is structured to be formed, as with the upper case 2, in a substantially Japanese battledore shape having a broad portion on the upper side and a narrow portion on the lower side and have a side surface portion of its outer edge attached to the upper case 2, as shown in FIG. 2 to FIG. 4. An optical reading section 6 is provided on the rear surface as the lower surface of the broad portion positioned on the upper side of this lower case 3.

This optical reading section 6 includes a laser reading section and an imaging section (both are not shown), and these sections are stored in a read projection section 6a provided projecting in a box shape to the rear surface positioned on the upper side in the broad portion of the lower case 3, as shown in FIG. 2 to FIG. 5. In the present embodiment, the read projection section 6a is provided with a first window section 6b corresponding to the laser reading section and a second window section 6c corresponding to the imaging section.

The optical reading section 6 is structured such that the laser reading section emits a laser beam from the first window section 6b of the read projection section 6a to the outside of the device case 1 and receives a reflected light of the laser beam so as to read, for example, a barcode of an article, as shown in FIG. 2 to FIG. 5. Also, this optical reading section 6 is structured such that the imaging section captures, through the second window section 6c, an image of an article from which its barcode is to be read by the laser reading section.

Also, to substantially the midpoint of the device case 1 in the longitudinal direction (length direction), that is, on both sides of the broad portion 1a positioned on a boundary side between the broad portion 1a and the narrow portion 1b, side trigger keys 8 are provided, as shown in FIG. 1 to FIG. 5. The side trigger keys 8 and the upper surface trigger key 5a of the key operation section 5 are to cause a reading operation by the optical reading section 6 to be performed.

Furthermore, on the narrow portion 1b positioned on the lower side of this device case 1, a battery accommodating section 11 to be covered by a battery cover 10 is provided so as to correspond to the key operation section 5, as shown in FIG. 2 to FIG. 6. This battery accommodating section 11 is to accommodate a rechargeable battery 12, is provided inside the narrow portion 1b of the device case 1 so as to correspond to the key operation section 5 provided on the narrow portion 1b of the device case 1, and is open to the back surface side by an opening 11a provided in the rear surface of the device case 1.

Also, on the rear surface of the lower case 3 positioned between the battery accommodating section 11 and the optical reading section 6, a pair of attachment levers 13 is provided to removably attach the battery cover 10 which openably covers the battery accommodating section 11 to the lower case 3, as shown in FIG. 2 and FIG. 4. That is, the pair of attachment levers 13 is provided near the side trigger keys 8 provided on both sides of the device case 1. The pair of these attachment levers 13 is structured to be rotated to removably engage the edge on the upper side of the battery cover 10 with the rear surface of the lower case 3.

As a result, the battery cover 10 is structured to be attached to the rear surface of the lower case 3 by the edge on the upper side being engaged with the lower case 3 by the pair of the attachment levers 13, with it extending across a lower surface trigger key 20 described further below from the lower side of the battery accommodating section 11 and operably covering the opening 11a of the battery accommodating section 11, as shown in FIG. 2, FIG. 4 and FIG. 5. Also, a fulcrum projection portion 10a is provided at the end on the lower side of the battery cover 10. The battery cover 10 is structured to open and close the battery accommodating section 11 by rotating the fulcrum projection portion 10a as a fulcrum.

On the narrow portion 1b positioned on the lower side of the device case 1, a grip section 14 is provided so as to be gripped by one hand of the user, across the front surface of the device case 1 serving as a first surface and the rear surface positioned opposite thereto and serving as a second surface, as shown in FIG. 1 to FIG. 4. This grip section 14 is structured to be gripped by one hand of the user in a gripping style where the thumb F1 of one hand of the user is placed on the front surface of the device case 1 and the rear surface of the device case 1 is held by other fingers F2 to F5 extended from the side of the device case 1.

That is, this grip section 14 is constituted by the narrow portion 1b of the device case 1 including the narrow portion of the upper case 2 and the narrow portion of the lower case 3, and the battery cover 10 of the lower case 3, as shown in FIG. 1 to FIG. 4. In the present embodiment, each of sides of the narrow portion of the upper case 2 and the narrow portion of the lower case 3 in the grip section 14 is formed in an arc-shaped curved surface which makes the hand of the user gripping the grip section 14 in the above-described gripping style naturally curved. Also, the battery cover 10 of the lower case 3 is formed in a curved shape projecting so as to be mildly curved from both sides of the lower case 3 toward the rear surface side.

As a result, the grip section 14 has a shape by which the other fingers F2 to F5 are naturally flexed and placed around the rear surface of the device case 1, in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 1 to FIG. 4.

That is, the grip section 14 is formed in a shape that can be easily gripped by one hand irrespective of the size of the hand of the user, by the gripping hand of the user fitting thereto when the user holds the device case 1 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 1 to FIG. 4.

Also, in this grip section 14, the battery cover 10 positioned on the rear surface is provided with a raised portion 15 as shown in FIG. 2 to FIG. 5. The raised portion 15 is raised to have a bulging shape between the index finger F2 and the middle finger F3 of the gripping hand of the user when the user holds the device case 1 by one hand in the gripping style where the user places the thumb F1 on the front surface of the device case 1 and holds the rear surface of the device case 1 by the other fingers F2 to F5 extended from the side of the device case 1.

Also, on the rear surface of the device case 1, a recessed portion 16 is provided so as to be recessed between the grip section 14 and the upper side of the device case 1 positioned in an extended area of this grip section 14, as shown in FIG. 2 to FIG. 5. That is, this recessed portion 16 is provided so as to be recessed between the raised portion 15 of the battery cover 10 and the read projection section 6a of the optical reading section 6.

As a result, the recessed portion 16 is structured such that the index finger F2 of the hand of the user gripping the grip section 14 is placed on a sloped surface of the recessed portion 16 positioned on the grip section 14 side when the user holds the grip section 14 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 2 to FIG. 5.

Also, the raised portion 15 has a V-shaped vertex portion 15a positioned between the index finger F2 and the middle finger F3 of the gripping hand of the user when the user holds the grip section 14 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 2 to FIG. 5. This vertex portion 15a is formed to be positioned between the index finger F2 and the middle finger F3 of the gripping hand of the user so as to be contiguous in a curved shape along a bent shape of the index finger F2 and the middle finger F3.

That is, this vertex portion 15a is formed so as to be contiguous in a curved shape along the bent shape of the index finger F2 and the middle finger F3 in a lateral direction orthogonal to the length direction of the device case 1 so that a contiguous middle portion in the lateral direction projects most toward the rear surface side of the device case 1 and the projection length gradually decreases from the middle portion in the lateral direction toward the both sides in the lateral direction, as shown in FIG. 2 to FIG. 5. Also this raised portion 15 includes a first finger rest area 17 as one tail of the vertex portion 15a and a second finger rest area 18 as the other tail of the vertex portion 15a.

The first finger rest area 17 is a sloped surface onto which the index finger F2 is pressed when the user grips the grip section 14 in the above-described gripping style, and is formed as a steep sloped surface from the upper side of the battery cover 10 toward the vertex portion 15a, as shown in FIG. 2 to FIG. 5. The second finger rest area 18 is a sloped surface onto which the middle finger F3 to the small finger F5 are pressed when the user grips the grip section 14 in the above-described gripping style, and is formed as a sloped surface mildly sloped from the vertex portion 15a toward the lower side of the battery cover 10.

That is, the first finger rest area 17 is formed as a sloped surface onto which the pulp of the index finger F2 of the hand of the user gripping the grip section 14 is pressed toward the lower side of the battery cover 10 in the longitudinal direction (length direction), that is, the hand of the user gripping the grip section 14 in the gripping style where the user places the thumb F1 on the key operation section 5 so as to operate the key operation section 5 by the thumb F1 and holds the rear surface of the device case 1 by the other fingers F2 to F5 extended from the side of the device case 1, as shown in FIG. 2 to FIG. 5.

This first finger rest area 17 is the sloped surface of the recessed portion 16 positioned on the grip section 14 side, and is formed as a sloped surface rising from the upper side positioned on the upper side of the battery cover 10 toward the vertex portion 15a at a steep angle, as shown in FIG. 2 to FIG. 5. Also, this first finger rest area 17 is curved in an arc shape corresponding to the bent state of the index finger F2 along the vertex portion 15a contiguous in the lateral direction orthogonal to the longitudinal direction (length direction) of the device case 1.

Accordingly, the raised portion 15 is structured such that the pulp of the index finger F2 of the user is pressed onto the first finger rest area 17 as the index finger F2 is in a shape being bent along the curve of the first finger rest area 17 and, in this state, the index finger F2 pulls the first finger rest area 17 toward the lower side of the device case 1 in the longitudinal direction, that is, toward the hand of the user gripping the grip section 14, when the user grips the grip section 14 in the gripping style where the user places the thumb F1 on the key operation section 5 and holds the rear surface of the device case 1 by the other fingers F2 to F5 extended from the side of the device case 1, as shown in FIG. 2 to FIG. 5.

On the other hand, the second finger rest area 18 is formed as a curved surface such that the pulp of each of the other fingers F3 to F5 of the hand of the user gripping the grip section 14 causes the battery cover 10 of the grip section 14 to be pressed toward the device case 1 and the middle finger F3 to the small finger F5 of the user are naturally flexed with them being aligned, when the user grips the grip section 14 in the gripping style where the user places the thumb F1 on the key operation section 5 so as to operate the key operation section 5 by the thumb F1 and holds the rear surface of the device case 1 by the other fingers F2 to F5 extended from the side of the device case 1, as shown in FIG. 2 to FIG. 5.

That is, this second finger rest area 18 is formed as a curved surface mildly sloped from the vertex portion 15a toward the lower side of the battery cover 10, as shown in FIG. 2 to FIG. 4. As a result, this second finger rest area 18 is formed in a mild curved shape with a convex toward the rear surface side of the device case 1 so that the fingers F3 to F5 other than the index finger F2 are aligned and naturally flexed, when the user grips the grip section 14 in the gripping style where the user places the thumb F1 on the key operation section 5 and holds the rear surface of the device case 1 by the other fingers F2 to F5 extended from the side of the device case 1.

Furthermore, this device case 1 is formed such that the grip section 14 has a bilaterally symmetrical shape with respect to the center position of the device case 1 in the lateral direction, as shown in FIG. 1 to FIG. 5. As a result, this device case 1 is structured such that the user can grip the grip section 14 by the right hand or the left hand in a similar manner.

Figure 9:
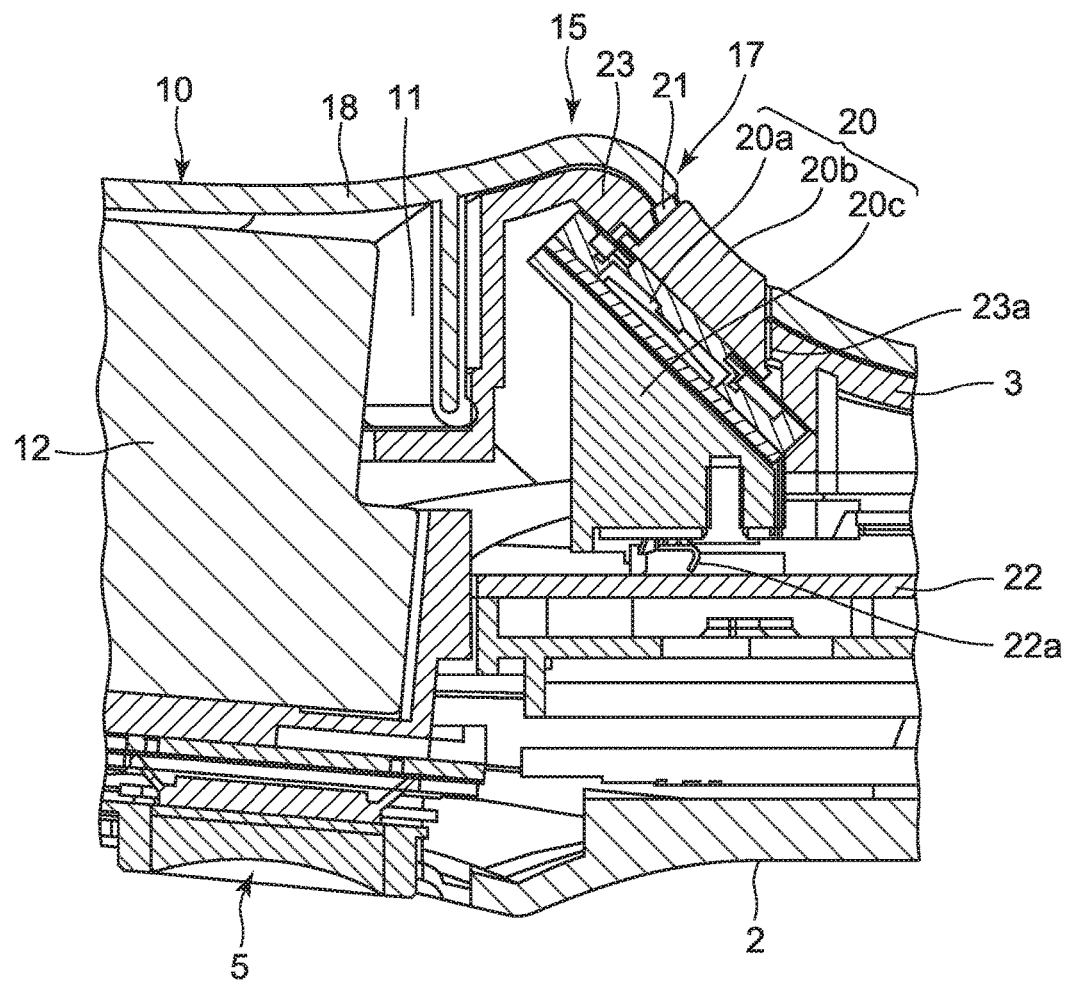
FIG. 9 is an enlarged cross sectional view of a lower-surface trigger key of the portable terminal shown in FIG. 5.
Figure 10:
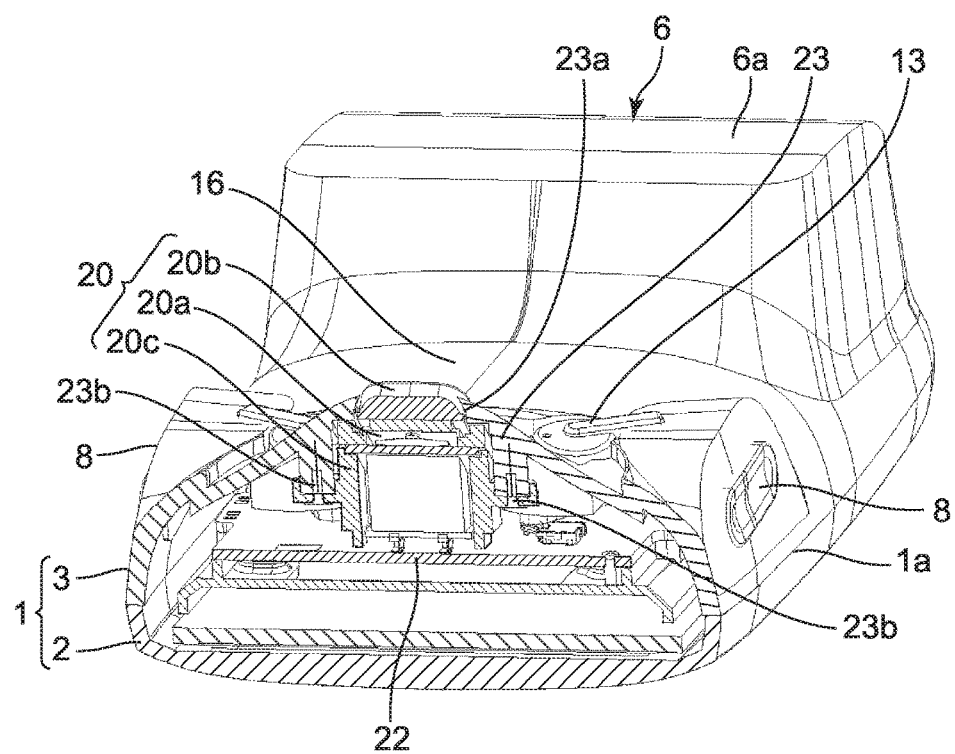
FIG. 10 is an enlarged perspective view of a cross section the portable terminal taken along line C-C in FIG. 6.

The battery cover 10 extends toward a pair of attachment levers 13 on the rear surface of the lower case 3 from the edge of the lower side of the battery accommodating section 11 across the first finger rest area 17 of the raised portion 15, as shown in FIG. 5, FIG. 9, and FIG. 10. That is, this battery cover 10 is formed such that its portion 17a extended toward the pair of attachment levers 13 is positioned across the lower surface trigger key 20 described further below.

Also, this battery cover 10 is structured such that the first finger rest area 17 of the raised portion 15 and the extended portion 17a are held by the rear surface of a cover holding section 23 provided to the lower case 3, as shown in FIG. 5, FIG. 9, and FIG. 10. This cover holding section 23 is raised and formed in a shape identical to that of the first finger rest area 17.

Inside this cover holding section 23, a lower surface trigger key 20 is provided, as shown in FIG. 5, FIG. 9, and FIG. 10. As with the upper surface trigger key 5a of the key operation section 5 and the side trigger keys 8, the lower surface trigger key 20 is to cause a reading operation by the optical reading section 6 to be performed, as shown in FIG. 5. The lower surface trigger key 20 includes a switch main body 20a, an operation button 20b, and a switch holding section 20c.

That is, the switch holding section 20c of the lower surface trigger key 20 is attached to the inner surface of the cover holding section 23 by a screw 23b with it being arranged in the cover holding section 23 corresponding to the first finger rest area 17, as shown in FIG. 5, FIG. 9, and FIG. 10. The switch main body 20a is held in the switch holding section 20c with it being sloped in parallel to the sloped surface of the first finger rest area 17. This switch main body 20a is electrically connected to a circuit board 22 provided, in the broad portion 1a of the device case 1 via a flexible wiring sheet 22a.

The operation button 20b, which is a pressing target portion as shown in FIG. 9 and FIG. 10, is provided in the switch main body 20a with it being sloped in parallel to the sloped surface of the first finger rest area 17 of the battery cover 10, and is arranged in a button insertion hole 21 provided in the first finger rest area 17 of the battery cover 10 through a button hole 23a provided in the cover holding section 23. As a result, the operation button 20b is structured to cause the switch main body 20a to perform an ON operation when pressed from outside the device case 1. In the present embodiment, the operation button 20b is arranged in the button insertion hole 21 of the extended portion 17a without projecting to the outside of the device case 1.

Accordingly, the lower surface trigger key 20 is structured such that the operation button 20b is not pressed by the pulp of the index finger F2 and the switch main body 20a does not perform an ON operation even if the pulp of the index finger F2 of the hand of the user gripping the grip section 14 is pressed onto the first finger rest area 17 along its curve with the index finger F2 being in a bent shape and, in this state, the raised portion 15 is pulled toward the lower side of the device case 1, that is, toward the hand of the user gripping the grip section 14, when the user grips the grip section 14 of the device case 1 by one hand, as shown in FIG. 5, FIG. 9 and FIG. 10.

Also, the lower surface trigger key 20 is structured such that, in the pressing state in which the user grips the grip section 14 of the device case 1 by one hand and presses the pulp of the index finger F2 of the hand gripping the grip section 14 along the curve of the first finger rest area 17 with the index finger F2 being in a bent shape, when the pulp of the index finger F2 pulls the raised portion 15 toward the lower side of the device case 1, that is, toward the hand of the user gripping the grip section 14, and is strongly pushed into the button insertion hole 21, the operation button 20b is pushed by the pulp of the index finger F2 to cause the switch main body 20a to perform an ON operation, as shown in FIG. 2, FIG. 9 and FIG. 10.

Next the mechanism of this portable terminal is described.

To use this portable terminal, the user first attaches the battery cover 10 to the rear surface of the device case 1 so as to cover the opening 11a of the battery accommodating section 11 provided to the narrow portion 1b of the device case 1. Here, the end portion of the battery cover 10 on the lower side is attached to the inner edge portion of the battery accommodating section 11 on the lower side and, with the fulcrum projection portion 10a at the end of this attached battery cover 10 as a fulcrum, the battery cover 10 is rotated to cause the upper side of the battery cover 10 to be placed on the cover holding section 23 of the lower case 3.

As a result, the extended portion 17a of the first finger rest area 17 of the battery cover 10 is arranged on the cover holding section 23 of the lower case 3 across the lower surface trigger key 20. Here, the button insertion hole 21 provided on the battery cover 10 corresponds to the button hole 23a of the cover holding section 23, and the operation button 20b of the lower surface trigger key 20 is inserted through this button hole 23a into the button hole 23a of the cover holding section 23. Here, the operation button 20b is arranged inside the button insertion hole 21 of the first finger rest area 17 without projecting outside the device case 1.

Also, here, the edge of the upper side of the battery cover 10 corresponds to the pair of attachment levers 13 provided on the rear surface of the lower case 3. Accordingly, by the user rotating the pair of these attachment levers 13, the edge of the upper side of the battery cover 10 is pressed onto and engaged with the rear surface of the lower case 3 by the pair of attachment levers 13. As a result, the battery cover 10 covers the opening 11a of the battery accommodating section 11 and is attached to the rear surface of the lower case 3 across the lower surface trigger key 20.

To use this portable terminal, the user holds the device case 1 by gripping the grip section 14 at the position of the battery cover 10 by one hand. That is, the user grips the grip section 14 by one hand in the gripping style where the user places the thumb F1 on the key operation section 5 so as to operate the key operation section 5 by the thumb F1 and holds the rear surface of the device case 1 by the other fingers F2 to F5 extended from the side of the device case 1.

Here, the thumb F1 is placed above the key operation section 5 on the front surface of the device case 1, and the vertex portion 15a of the raised portion 15 having a bulging shape is arranged between the index finger F2 and the middle finger F3 of the hand of the user gripping the grip section 14. In this state, the pulp of the index finger F2 is pressed onto the first finger rest area 17 in the raised portion 15 of the battery cover 10 positioned on the rear surface side of the device case 1, and the pulp of each of the other fingers F3 to F5 is placed on the second finger rest area 18 of the raised portion 15.

In this state, in the gripping style where the user places the thumb F1 on the key operation section 5 so as to operate the key operation section 5 by the thumb F1 and holds the rear surface of the device case 1 by the other fingers F2 to F5 extended from the side of the device case 1, the pulp of the index finger F2 of the hand of the user gripping the grip section 14 is pressed onto the sloped surface of the first finger rest area 17 in the raised portion 15 of the battery cover 10 and, in this state, the index finger F2 of the gripping hand is pulled so that the first finger rest area 17 is pulled toward the lower side of the device case 1, that is, toward the hand of the user gripping the grip section 14.

In the present embodiment, when the pulp of the index finger F2 is pressed onto the sloped surface of the first finger rest area 17 in the raised portion 15 of the battery cover 10 and is pulled toward the lower side of the device case 1, that is, toward the hand of the user gripping the grip section 14, the index finger F2 is naturally flexed and pressed along the first finger rest area 17.

Here, even when the index finger F2 of the hand of the user gripping the grip section 14 is pressed onto the first finger rest area 17 along its curve with it being in a bent shape, the pulp of the index finger F2 is not deeply pressed into the button insertion hole 21 in the first finger rest area 17. Accordingly, the operation button 20b is not pushed by the pulp of the index finger F2, and the switch main body 20a does not perform an ON operation.

Also, here, in the gripping style where the user places the thumb F1 on the key operation section 5 so as to operate the key operation section 5 by the thumb F1 and holds the rear surface of the device case 1 by the other fingers F2 to F5 extended from the side of the device case 1, the pulp of each of the other fingers F3 to F5 of the hand of the user gripping the grip section 14 is pressed onto the second finger rest area 18 of the raised portion 15. In this state, the fingers F3 to F5 are placed with them being naturally flexed along the curved surface of the second finger rest area 18.

That is, with the vertex portion 15a of the raised portion 15 having a bulging shape being arranged between the index finger F2 and the middle finger F3 of the gripping hand of the user, the middle finger F3 to the small finger F5 are placed so as to be aligned in the second finger rest area 18 with them being naturally flexed to wrap the second finger rest area 18 of the raised portion 15. Accordingly, the fingers F3 to F5 are favorably and stably placed along the curved surface of the second finger rest area 18. This allows the user to reliably and favorably grip the grip section 14 of the device case 1 by one hand.

As described above, the grip section 14 is provided to the narrow portion 1b of the device case 1, and has a curved shape projecting so as to be mildly curved from both sides toward the rear surface of the grip section 14. As a result, when the user grips the grip section 14 of the device case 1, the user can reliably and favorably grip the grip section 14 of the device case 1 by the hand gripping the grip section 14. Also, the user can fit the hand gripping the grip section 14 to the grip section 14.

Also, the grip section 14 is formed in a bilaterally symmetrical shape with respect to the center position of the device case 1 in the lateral direction. Therefore, when the user grips the grip section 14 of the device case 1 by one hand, the grip section 14 of the device case 1 can be reliably and favorably gripped by the right hand or the left hand of the user. Here, by the lower surface of the grip section 14 being formed in a curved shape mildly curved to project the gripping hand of the user fits the grip section 14 when the user grips the grip section 14 of the device case 1 by one hand.

When the user grips the grip section 14 of the device case 1 as described above, the thumb F1 is placed above the key operation section 5 without obstructing the display section 4, so that the user can favorably perform key operations on the key operation section 5 by freely moving the thumb F1 above the key operation section 5 while viewing information displayed on the display section 4.

Also, when the user grips the grip section 14 of the device case 1, the index finger F2 is placed on the sloped surface of the first finger rest area 17 of the raised portion 15, that is, the sloped surface of the recessed portion 16 positioned on the grip section 14 side. Therefore, the user can easily operate, by using the index finger F2, the operation button 20b of the lower surface trigger key 20 inserted into the button insertion hole 21 provided in the first finger rest area 17 that is the sloped surface of this recessed portion 16.

That is, when the user grips the grip section 14 of the device case 1 by one hand, the user presses the pulp of the index finger F2 of the hand gripping the grip section 14 onto the first finger rest area 17 along its curve, with the index finger F2 being in a bent shape, and pulls the first finger rest area 17 toward the lower side of the device case 1, that is toward the hand of the user gripping the grip section 14. In this state, when the pulp of the index finger F2 is strongly pushed into the button insertion hole 21, the operation button 20b of the lower surface trigger key 20 is pushed by the pulp of the index finger F2 to cause the switch main body 20a of the lower surface trigger key 20 to perform an ON operation.

When the lower surface trigger key 20 performs an ON operation as described above, the optical reading section 6 provided on the rear surface of the broad portion 1a of the device case 1 is driven to cause the laser reading section to emit a laser beam from the first window section 6b of the read projecting portion 6a to the outside of the device case 1, and receives a reflected light of the laser beam so as to read, for example, a barcode of an article. Also, here, through the second window section 6c, the imaging section of the optical reading section 6 captures an image of for example, an article from which its barcode is to be read.

As described above, this portable terminal includes the battery accommodating section 11 having the opening 11a for battery insertion and removal provided at a position shifted to one end of the terminal main body on the rear surface side that is a predetermined surface side of the device case 1, the battery cover 10 for covering the opening 11a, and the lower surface trigger key 20 provided on the rear surface side of the device case 1 and located closer to the other end of the device case 1 than the battery accommodating section 11. This battery cover 10 is provided extending from one end of the device case 1 to a position beyond the lower surface trigger key 20. Therefore, the lower surface trigger key 20 is made less prone to an outer shock and can be favorably protected.

That is, in this portable terminal, the battery cover 10 is attached to the rear surface of the device 1 with it being extended from the lower side of the device case 1 to an area beyond the lower surface trigger key 20 on the upper side. Therefore, the rear surface of the device case 1 to which the lower surface trigger key 20 corresponds can be reliably covered by the battery cover 10 and thereby reliably and favorably protected by the battery cover 10.

Accordingly, in this portable terminal, an outer shock can be received by the battery cover 10. Therefore, the rear surface of the device case 1 to which the lower surface trigger key 20 corresponds can be prevented from directly receiving an outer shock, whereby the lower surface trigger key 20 can be favorably protected from shock. Also, even if the battery cover 10 is damaged or broken by an outer shock or the like, the battery cover 10 can be replaced. Therefore, the device case 1 can be used in that condition.

Also, the lower surface trigger key 20 is provided such that the operation button 20b that is a pressing target portion is exposed from the battery cover 10. Therefore, the user can favorably operate the lower surface trigger key 20. That is, in this portable terminal, the lower surface trigger key 20 exposed from the battery cover 10 can be favorably operated while the user grips the device case 1 by hand.

Also, in this portable terminal, the battery cover 10 is formed having a bulging shape on the rear surface that is a predetermined surface. Therefore, when the user grips the device case 1 by hand, the user can place a finger on the bulge of the battery cover 10, and thereby can easily grip the device case 1 by hand. Therefore, the user can favorably grip the device case 1 by hand and, in this state, can favorably operate the lower surface trigger key 20.

That is, in this portable terminal, the raised portion 15 having a bulging shape is provided on the battery cover 10 so that the vertex portion 15a is positioned between the index finger F2 and the middle finger F3 of the hand of the user gripping the grip section 14 when the user grips the device case 1 in the gripping style where the user places the thumb F1 on the front surface of the device case 1 and holds the rear surface of the device case 1 by at least the index finger F2 and the middle finger F3 extended from the side of the device case 1. Therefore, the user can press the pulp of the index finger F2 of the hand gripping the grip section 14 onto the first finger rest area 17 that is a sloped surface area on the index finger F2 side of the raised portion 15.

As a result, in this portable terminal, the user can press the pulp of the index finger F2 of the hand gripping the grip section 14 onto the first finger rest area 17 that is the sloped surface of the raised portion 15 of the battery cover 10 toward the lower side of the raised portion 15, that is, toward the gripping hand of the user. Therefore, the index finger F2 can be pulled toward the gripping hand of the user positioned on the lower side of the device case 1, and whereby the user can grip the device case 1 by reliably and favorably gripping the grip section 14 of the device case 1.

As described above, the device case 1 includes the cover holding section 23 on the rear surface in a bulging shape identical to the bulging shape of the battery cover 10. Therefore, when the battery case 10 covers the opening 11a of the battery accommodating section 11 and is attached to the rear surface of the device case 1, the battery cover 10 can be favorably and reliably held by the cover holding section 23 even though the battery cover 10 has a bulging shape.

Also, in this portable terminal, the battery accommodating section 11 and the lower surface trigger key 20 are provided to the grip section 14 for the user to grip the device case 1 in the predetermined style. Therefore, the user can favorably grip the grip section 14 even though the battery accommodating section 11 and the lower surface trigger key 20 are provided.

That is, this portable terminal is provided with the lower surface trigger key 20 which is operable by the index finger F2 of the hand of the user gripping the grip section 14 when the user grips the grip section 14 in the gripping style where the user places the thumb F1 on the front surface of the device case 1 and holds the rear surface of the device case 1 by at least the index finger F2 and the middle finger F3 extended from the side of the device case 1. The lower surface trigger key 20 is provided inside the device case 1 so as to correspond to the first finger rest area 17 that is a sloped surface area of the raised portion 15 having a bulging shape. Therefore, the user can favorably operate the lower surface trigger key 20 by the index finger F2 of the hand gripping the grip section 14.

That is, this portable terminal is provided with the lower surface trigger key 20 so as to expose the operation button 20b that is a pressing target portion from the first finger rest area 17 as the sloped surface area of the raised portion 15. Therefore, when the user grips the grip section 14 in the gripping style where the user places the thumb F1 on the front surface of the device case 1 and holds the rear surface of the device case 1 by at least the index finger F2 and the middle finger F3 extended from the side of the device case 1, the index finger F2 of the hand of the user gripping the grip section 14 can be placed so as to correspond to the lower surface trigger key 20, and the lower-surface trigger key 20 can be operated in this state, whereby the operability of the lower surface trigger key 20 can be improved.

In the present embodiment, the battery cover 10 is provided to the grip section 14 for gripping the device case 1 in the predetermined gripping style. Therefore, the battery cover 10 can be formed in a shape that can be easily gripped by the user's hand, whereby the user can easily grip the grip section 14 by hand.

That is, in this portable terminal, the battery cover 10 is formed in a shape by which the user can easily grip by hand when the user grips the grip section 14 in the gripping style where the user places the thumb F1 on the front surface of the device case 1 so as to operate the key operation section 5 by the thumb F1 and holds the rear surface of the device case 1 by the other fingers F2 to F5 extended from the side of the device case 1. Therefore, the hand of the user can be naturally placed around the grip section 14. As a result, the grip section 14 can be gripped by favorably fitting the hand to the grip section 14.

Also, in this portable terminal, the battery cover 10 forms the rear surface of the grip section 14. Therefore, the battery cover 10 is formed in a shape by which the hand of the user gripping the grip section 14 is naturally placed around the grip section 14 of the device case 1. Accordingly, the shape of the device case 1 is not complex and the device case 1 can be easily manufactured.

Also, the pair of attachment levers 13 are provided on the rear surface of the device case 1 to attach the edges of the battery cover 10 positioned on both sides of the lower surface trigger key 20 to the rear surface of the device case 1. Therefore, when the battery case 10 is arranged on the rear surface of the device case 1 so as to cover the opening 11a of the battery accommodating section 11 provided in the narrow portion 1b of the device case 1, the edges of the battery cover 10 can be made to correspond to the pair of attachment levers 13. Therefore, by rotating the pair of the attachment levers 13, the edges of the battery cover 10 can be pressed onto and engaged with the rear surface, whereby the battery cover 10 can be easily attached to the device case 1.

Furthermore, this battery cover 10 can be opened or closed with the fulcrum projection portion 10a at the end on the lower side that is one end of the device case 1 as a fulcrum, can favorably cover the opening 11a of the battery accommodating section 11 provided in the narrow portion 1b of the device case 1, and can be easily and reliably arranged on the rear surface of the device case 1. That is, the opening/closing operation of the battery cover 10 can be easily and favorably performed.

In the above-described embodiment, the display section 4 and the key operation section 5 are provided on the front surface of the device case 1. However, the present invention is not limited thereto. For example, the key operation section 5 may be an input display section formed of a transparent touch panel and having a display panel laminated thereon.

While the present invention has been described with reference to the preferred embodiments, it is intended that the invention be not limited by any of the details of the description therein but includes all the embodiments which fall within the scope of the appended claims.

What is claimed is:

1. A portable terminal comprising:
    a terminal main body having a first end and a second end at opposite ends thereof in a longitudinal direction of the terminal main body;
    a battery accommodating section having an opening for battery insertion and removal which is provided on a predetermined side of the terminal main body and is closer to the first end of the terminal main body than to the second end of the terminal main body in the longitudinal direction;
    a battery cover for covering the opening; and
    a switch provided on the same predetermined side of the terminal main body as the opening, the switch being provided between the opening and the second end of the terminal main body in the longitudinal direction of the terminal main body, and the switch being operable by a user while the battery cover covers the opening;
    wherein the battery cover extends from an area covering the opening to a position between the switch and the second end of the terminal main body, in the longitudinal direction, on the predetermined side of the terminal main body.

2. The portable terminal according to claim 1, wherein the pressing target of the switch is exposed from the battery cover.

3. The portable terminal according to claim 1, wherein the predetermined side of the terminal main body has a bulging shape.

4. The portable terminal according to claim 1, wherein the battery accommodating section and the switch are provided to a grip section of the terminal main body, the grip section being configured to be gripped by a user.

5. The portable terminal according to claim 1, wherein the battery cover is provided to a grip section of the terminal main body, the grip section being configured to be gripped by a user.

6. The portable terminal according to claim 1, wherein the switch is provided at a middle portion of the terminal main body in a lateral direction of the terminal main body that is orthogonal to the longitudinal direction.

7. The portable terminal according to claim 6, further comprising:
    an attachment lever for attaching the battery cover to the terminal main body,
    wherein the attachment lever is provided on the predetermined side of the terminal main body, at a position between the switch and the second end of the terminal main body in the longitudinal direction.

8. The portable terminal according to claim 6, further comprising:
    at least two attachment levers for attaching the battery cover to the terminal main body,
    wherein the attachment levers are provided on the predetermined side of the terminal main body, at positions between the switch and the second end of the terminal main body in the longitudinal direction, and
    wherein the attachment levers are provided such that the switch is interposed therebetween in the lateral direction of the terminal main body.

9. The portable terminal according to claim 6, further comprising an optical reader that is provided at a position closer to the second end of the terminal main body than the switch in the longitudinal direction.

10. The portable terminal according to claim 9, wherein the optical reader is configured to start a reading operation in response to an operation being performed on the switch.

11. The portable terminal according to claim 9, further comprising:
    an attachment lever for attaching the battery cover to the terminal main body,
    wherein the optical reader is provided at a position closer to the second end of the terminal main body than the attachment lever in the longitudinal direction.

12. The portable terminal according to claim 1, wherein the switch is elongated along a lateral direction of the terminal main body that is orthogonal to the longitudinal direction.

13. The portable terminal according to claim 1, further comprising:
    a key operation section including a plurality of keys; and
    a display,
    wherein the key operation section and the display are provided on a side of the terminal main body that is opposite from the predetermined side of the terminal main body, and
    wherein the switch is provided on the predetermined side of the terminal main body at a position along the longitudinal direction corresponding to a position between the key operation section and the display.

14. The portable terminal according to claim 13, wherein the opening is provided on a rear side of the key operation section.

15. The portable terminal according to claim 13, wherein the terminal main body is formed such that an area where the display is provided is broader than an area where the key operation section is provided, in a lateral direction of the terminal main body that is orthogonal to the longitudinal direction.

16. The portable terminal according to claim 1, wherein the battery cover has a hole in which a pressing target of the switch is exposed.

17. An imaging device comprising:
    a terminal main body having a first end and a second end at opposite ends thereof in a longitudinal direction of the terminal main body;
    a battery accommodating section having an opening for battery insertion and removal which is provided on a predetermined side of the terminal main body and is closer to the first end of the terminal main body than to the second end of the terminal main body in the longitudinal direction;
    a battery cover for covering the opening;
    an imaging section provided on the same predetermined side of the terminal main body as the opening, the imaging device being provided closer to the second end of the terminal main body than the battery accommodating section in the longitudinal direction of the terminal main body; and a switch provided on the same predetermined side of the terminal main body as the opening and the imaging section, the switch being provided in an area between the opening and the imaging section in the longitudinal direction of the terminal main body, and the switch being operable by a user, while the battery cover covers the opening, to start an imaging operation by the imaging section, wherein the battery cover extends from an area covering the opening to a position between the switch and the second end of the terminal main body, in the longitudinal direction, on the predetermined side of the terminal main body.

18. The imaging device according to claim 17, wherein an end of the battery cover is positioned between the switch and the imaging section, in the longitudinal direction on the predetermined side of the terminal main body.

19. A reading device comprising:

a terminal main body having a first end and a second end at opposite ends thereof in a longitudinal direction of the terminal main body;

a battery accommodating section having an opening for battery insertion and removal which is provided on a predetermined side of the terminal main body and is closer to the first end of the terminal main body than to the second end of the terminal main body in the longitudinal direction;

a battery cover for covering the opening;

an optical reader provided on the same predetermined side of the terminal main body as the opening, the optical reader being provided closer to the second end of the terminal main body than the battery accommodating section in the longitudinal direction of the terminal main body; and a switch provided on the same predetermined side of the terminal main body as the opening and the optical reader, the switch being provided in an area between the opening and the optical reader in the longitudinal direction of the terminal main body, and the switch being operable by a user, while the battery cover covers the opening, to start a reading operation by the optical reader, wherein the battery cover extends from an area covering the opening to a position between the switch and the second end of the terminal main body, in the longitudinal direction, on the predetermined side of the terminal main body.

20. The reading device according to claim 19, wherein an end of the battery cover is positioned between the switch and the optical reader, in the longitudinal direction on the predetermined side of the terminal main body.

* * * * *